УС011572729B2

United States Patent
Matsumoto et al.

(10) Patent No.: US 11,572,729 B2
(45) Date of Patent: Feb. 7, 2023

(54) PROTECTOR WITH SENSOR

(71) Applicants: NISHIKAWA RUBBER CO., LTD., Hiroshima (JP); AISIN CORPORATION, Aichi-ken (JP)

(72) Inventors: Michihiko Matsumoto, Hiroshima (JP); Toshimichi Kawaguchi, Hiroshima (JP); Daisuke Hayashi, Hiroshima (JP); Wataru Hattori, Kariya (JP)

(73) Assignees: NISHIKAWA RUBBER CO., LTD., Hiroshima-Ken (JP); AISIN CORPORATION, Kariya (JP)

( * ) Notice: Subject to any disclaimer, the term of this patent is extended or adjusted under 35 U.S.C. 154(b) by 38 days.

(21) Appl. No.: 17/235,221

(22) Filed: Apr. 20, 2021

(65) Prior Publication Data

US 2021/0324670 A1 Oct. 21, 2021

(30) Foreign Application Priority Data

Apr. 21, 2020 (JP) .............................. JP2020-075755

(51) Int. Cl.
*E05F 15/44* (2015.01)
*B60J 10/86* (2016.01)

(52) U.S. Cl.
CPC ............... *E05F 15/44* (2015.01); *B60J 10/86* (2016.02); *E05Y 2900/531* (2013.01)

(58) Field of Classification Search
CPC ......... E05F 15/44; E05F 15/443; E05F 15/46; E05F 15/47
See application file for complete search history.

(56) References Cited

U.S. PATENT DOCUMENTS

| 6,339,305 B1* | 1/2002 | Ishihara | E05F 15/44 49/27 |
| 9,114,691 B2* | 8/2015 | Kawaguchi | B29C 45/16 |
| 2003/0106377 A1* | 6/2003 | Ishihara | E05F 15/44 73/756 |
| 2012/0222296 A1* | 9/2012 | Miyamoto | E05F 15/443 29/825 |
| 2014/0339842 A1* | 11/2014 | Kawaguchi | B60J 10/24 296/1.04 |
| 2015/0267453 A1* | 9/2015 | Matsumoto | B60J 5/06 49/27 |
| 2015/0267457 A1* | 9/2015 | Matsumoto | B60J 10/82 73/862.541 |

(Continued)

FOREIGN PATENT DOCUMENTS

| EP | 2921330 A2 * | 9/2015 | ....... B29C 45/14467 |
| JP | 3291233 B2 | 6/2002 | |

(Continued)

*Primary Examiner* — Marcus Menezes
(74) *Attorney, Agent, or Firm* — Holtz, Holtz & Volek PC (57) ABSTRACT

A protector with a sensor couples to a sliding door. A first end of an insert made of a non-conductive material is inserted in and fills up a space on a hollow part of the protector, and a terminal part is into die molding. The insert includes at least two feeding ports to receive and feed molding material into the insert during die molding. The feeding ports are spaced from each other and formed along a direction in which a wire harness extends. Covered parts are exposed from the wire harness where the covered parts are faced with the feeding ports.

13 Claims, 10 Drawing Sheets

(56) References Cited

U.S. PATENT DOCUMENTS

| | | | |
|---|---|---|---|
| 2015/0267462 A1* | 9/2015 | Matsumoto | G01D 11/16 |
| | | | 73/862.541 |
| 2020/0157872 A1 | 5/2020 | Matsumoto et al. | |
| 2020/0223295 A1 | 7/2020 | Matsumoto et al. | |
| 2021/0095512 A1* | 4/2021 | Matsumoto | E05F 15/44 |
| 2021/0107340 A1* | 4/2021 | Ishibashi | E05F 15/44 |
| 2021/0109246 A1* | 4/2021 | Matsumoto | B60J 10/24 |
| 2021/0324671 A1* | 10/2021 | Ikeda | B60J 5/107 |

FOREIGN PATENT DOCUMENTS

| | | |
|---|---|---|
| JP | 2011022038 A | 2/2011 |
| JP | 2015020548 A | 2/2015 |
| JP | 2015212998 A | 11/2015 |
| JP | 6258735 B2 | 12/2017 |
| JP | 2021054130 A | 4/2021 |

* cited by examiner

PROTECTOR WITH SENSOR

CROSS REFERENCE TO RELATED APPLICATION

This application claims the benefit under 35 USC § 119 of JP Patent Application JP 2020-075755 filed Apr. 21, 2020, the entire disclosure of which is incorporated herein by reference.

BACKGROUND INFORMATION

The present invention relates to a protector with a sensor. When an object including a finger is disposed between an opening of an automobile body and a panel which moves between at least two positions to open and close the opening of the automobile body, the sensor fixed in the protector outputs a corresponding signal upon detecting the object. The panel includes doors such as a sliding door, a back door, and a sun roof, on a wagon, a station wagon, or the like.

Figure 10:
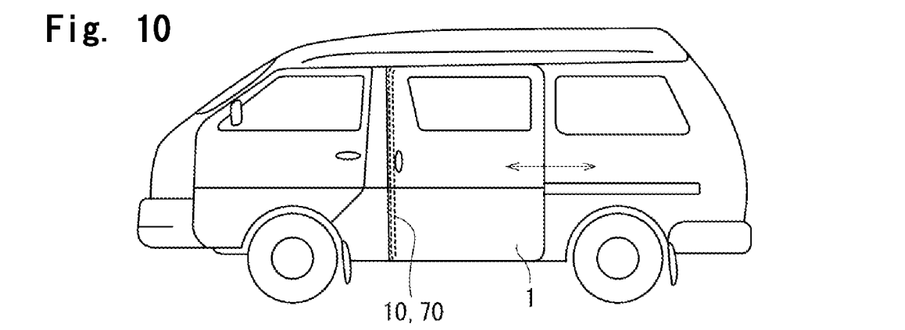
FIG. 10 is a side view of an automobile with a sliding door which opens and closes an opening of an automobile body.
Figure 11:
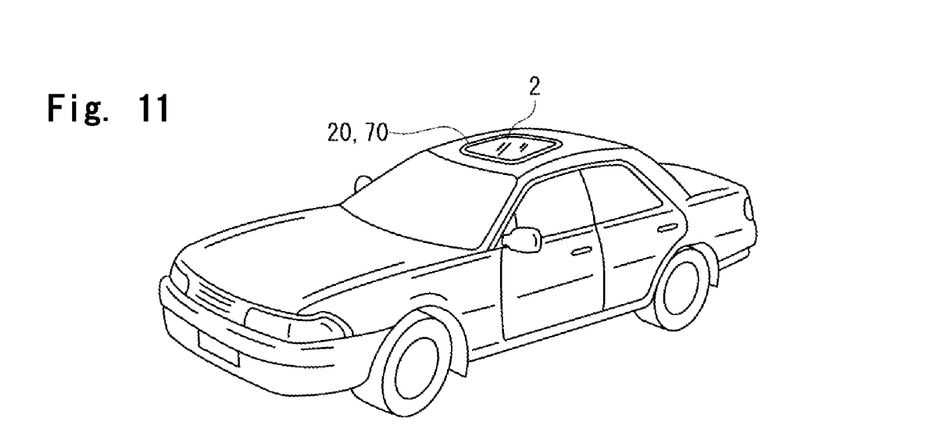
FIG. 11 is a perspective view of an automobile with a sun roof.

A protector 10, 20 with a sensor couples to an automobile including a wagon illustrated in FIG. 10 and an automobile illustrated in FIG. 11. A sliding door 1 (or a back door) of the wagon opens and closes the opening of the automobile body. A sun roof 2 of the automobile opens and closes the opening of the automobile body.

Figure 12:
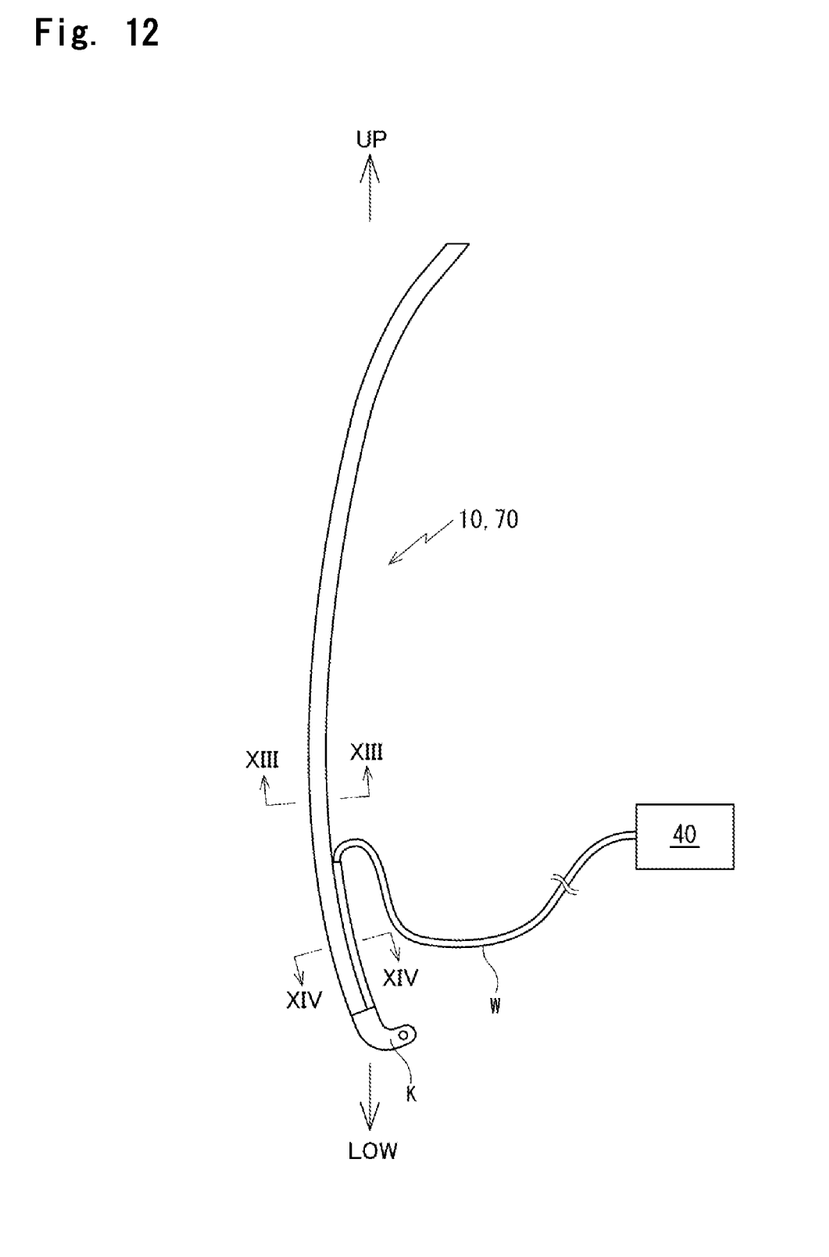
FIG. 12 is a side view of a protector illustrated in FIG. 10 with a sensor.

The protector 10 couples to a front end surface of the sliding door 1 and extends toward a front part of the automobile body from the front end surface. The protector 10 extends in an upper and lower direction of the automobile body as illustrated in FIG. 12.

Figure 13:
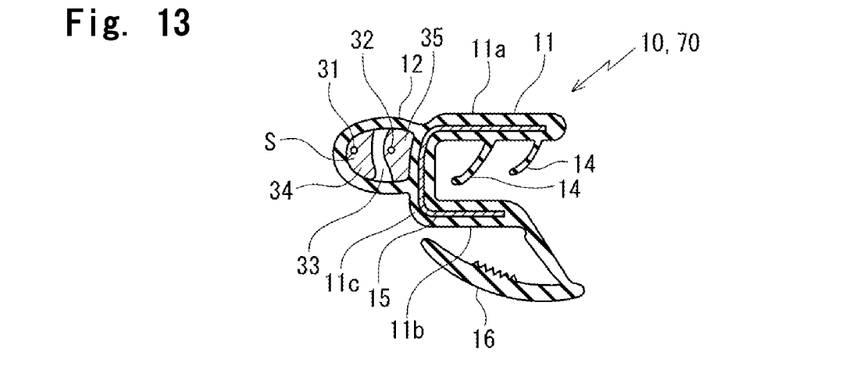
FIG. 13 is an enlarged cross sectional view of the protector taken along line XIII-XIII of FIG. 12.
Figure 14:
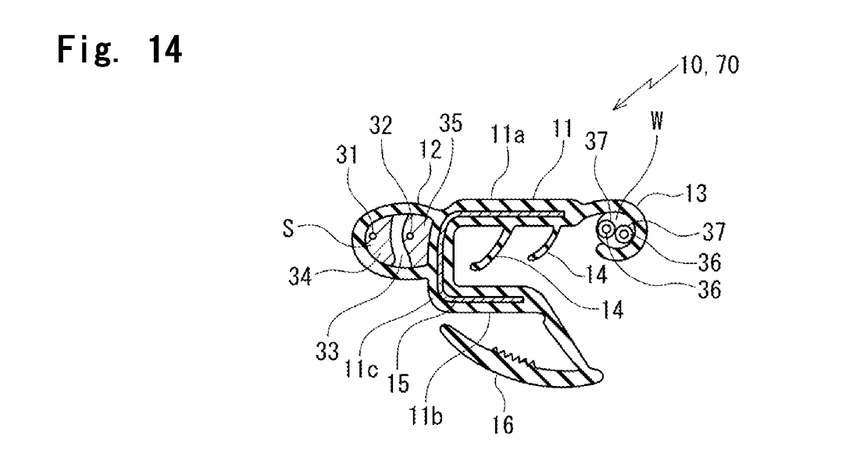
FIG. 14 is an enlarged cross sectional view of the protector taken along line XIV-XIV of FIG. 12.

As illustrated in FIG. 13 and FIG. 14, the protector 10, which couples to the front end surface of the sliding door 1, includes an installation base member 11 and a hollow part 12. The installation base member 11 has a substantially U-shaped cross section including an inner-cabin side wall 11a, an outer-cabin side wall 11b, and a connecting wall 11c. The hollow part 12 is integrally formed with the installation base member 11. The hollow part 12 includes a sensor (pressure sensitive sensor) S. The sensor S outputs a corresponding electric signal upon detecting the object such as part of human bodies (fingers, hands, or legs) between the sliding door 1 and the opening of the automobile body (may also be front door or side door) (see, for example, Japanese Patent No. 3291233).

In a lower part of the protector 10, a channel part 13 is integrally formed with the inner-cabin side wall 11a of the installation base member 11. The channel part 13 has a substantially C-shaped cross section and holds a wire harness W. The wire harness W is joined with the pressure sensitive sensor S. The installation base member 11 has a plurality of holding lips 14, 14 formed inside and a core 15 embedded. The core 15 has a substantially U-shaped cross section and increases rigidity of the installation base member 11. In addition, a decorative lip 16 is provided on the outer-cabin side wall 11b of the installation base member 11.

The sensor (pressure sensitive sensor) S is fixed in the hollow part 12. The hollow part 12 has two core wires (electrode wires) 31, 32, rubber like elastic bodies 34, 35, and a space 33. The core wires 31, 32 extend in an upper and lower direction (longitudinal direction) and are embedded in the rubber like elastic bodies 34, 35. The rubber like elastic bodies 34, 35 have conductivity. The space 33 is positioned between the rubber like elastic bodies 34, 35. When the object is disposed between the sliding door 1 and the opening as the sliding door 1 is moved towards a closed position and the object makes contact with part of the hollow part 12, the object causes the rubber like elastic bodies 34, 35 to contact with each other and the two core wires 31, 32 to short. Resultant change in electric signal is transmitted to a control unit 40 by leads 36, 36, and as a result, the object is detected. The leads 36, 36 are connected with the two core wires 31, 32 in a lower side terminal part of the protector 10 and are joined with the control unit 40. The leads 36, 36 are covered with insulator and are tied by the wire harness W. Top ends of the leads 36, 36 are bared from covered parts 37, 37 and are naked wires.

Figure 15A:
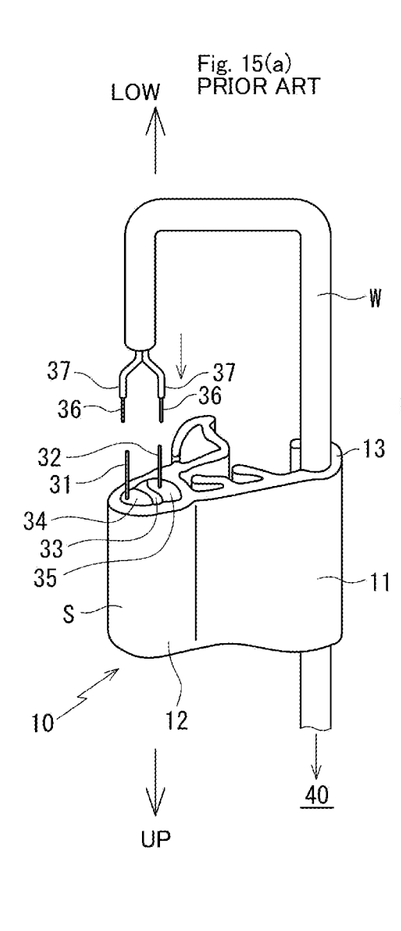
FIG. 15(a), FIG. 15(b), and FIG. 15(c) are perspective views of a lower terminal part of a protector according to a prior art with a sensor before die molding with the views arranged according to the timeline.
Figure 15B:
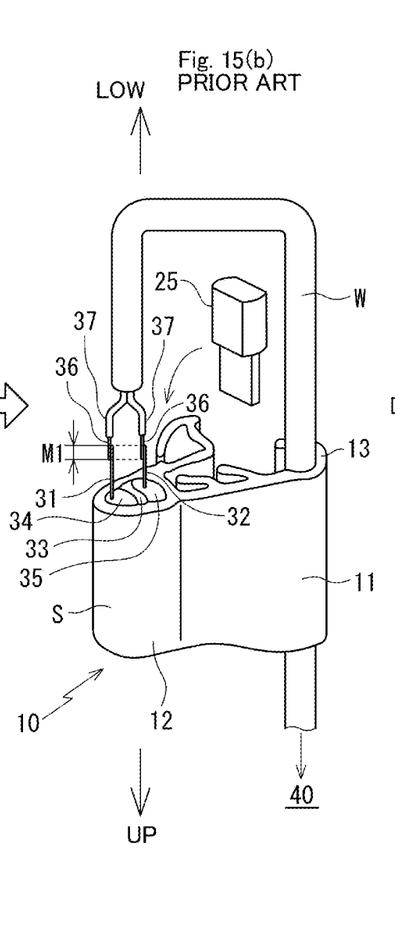
Figure 15C:
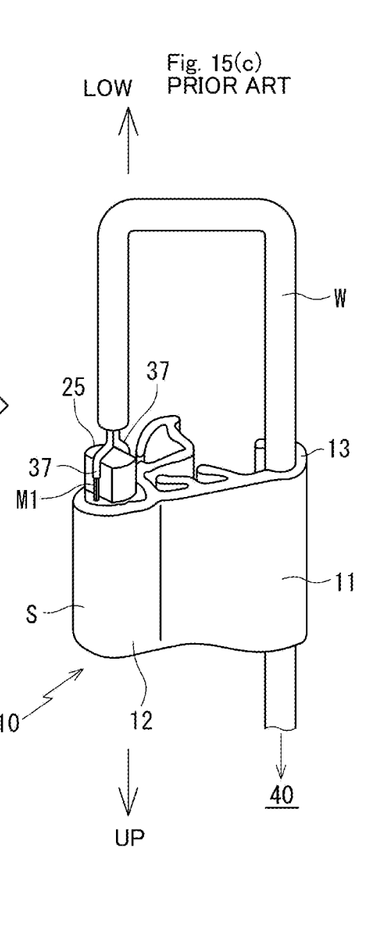
Figure 16:
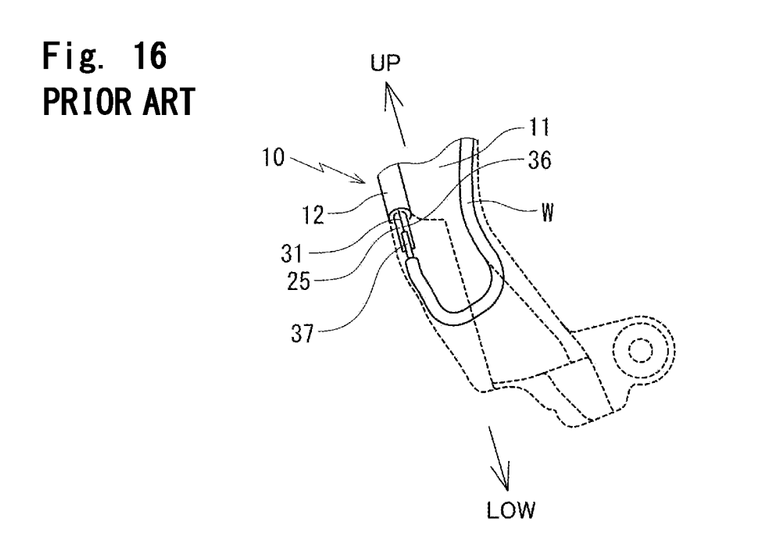
FIG. 16 is a perspective view of a structural outline of the lower terminal part of the protector according to the prior art after die molding.

As illustrated in FIGS. 15(a) to 15(c), in the lower side terminal part of the protector 10, the leads 36, 36 are piled on the two core wires 31, 32 and the leads 36, 36 are connected by means of resistance welding or soft soldering (FIG. 15(b)). The two core wires 31, 32 are drawn out in a longitudinal direction. Also, an insert 25 fills up the space 33 for the space 33 is exposed in an end part (FIG. 15(c)). Then, wire connection parts M1, the insert 25, and part of the wire harness W are embedded in a part molded by mold as illustrated in FIG. 16, and are not exposed. The insert 25 fills up the space 33 to prevent molding material from flowing into the space 33 and to prevent damages on sensing function. In FIG. 16, dotted lines indicate the part molded by mold.

Injection molding pressure affects the wire connection parts M1, embedded in the part molded by mold. In this connection, in the lower side terminal part of the protector 10, the wire connection parts M1 and the leads 36, 36 are firmly fixed to a surface of the insert 25 by adhesive for positioning. With this configuration, the wire connection parts M1 are not exposed from the part molded by mold or the wires are not damaged.

This configuration, however, necessitates an extra process of adhesion. In addition, an increased amount of adhesive causes insufficient adhesion. Also, use of adhesive tends to cause unevenness and makes it difficult to stably fix the wire connection parts M1. Further, the wire connection parts M1, once fixed to the surface of the insert 25 by adhesive, are hard to detach for repairment or replacement.

In case the leads 36, 36 are unevenly connected with the two core wires 31, 32, ends of the leads 36, 36 may stick out of the surface of the terminal part.

Japanese Patent No. 3291233 is directed to a metal piece as a clip to fix a connection part between cords. This configuration, however, is time-consuming and is complex, for the metal piece necessitates fixing by welding. In addition, Japanese Patent No. 3291233 does not disclose the insert or aim at preventing the molding material from flowing into the hollow part.

Figure 17:
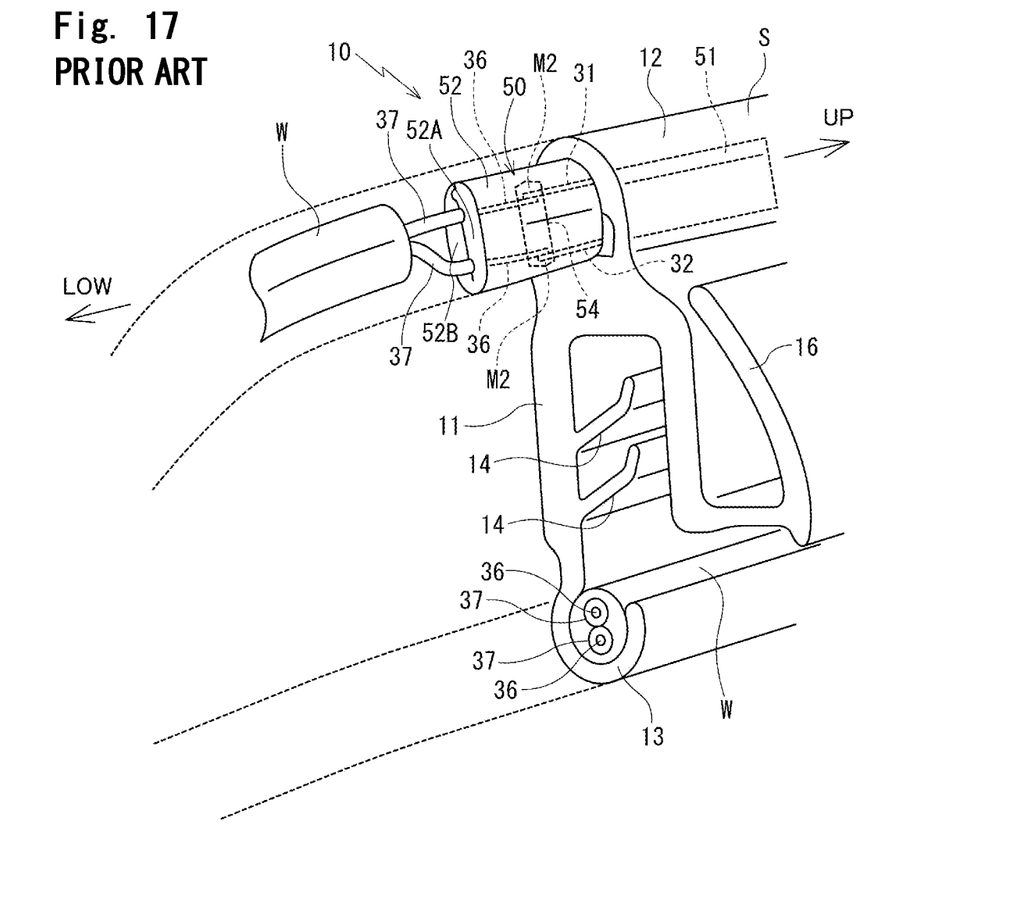
FIG. 17 is a perspective view of the structural outline of the lower terminal part of another protector according to the prior art with a sensor after die molding.

In this connection, FIG. 17 illustrates the protector 10. A first end of the insert 50 includes an insertion part 51, and a second end of the insert 50 includes a protrusion part 52 and a pressing part 54. The protrusion part 52 includes a support member 52A and a lid 52B to cover the support member 52A. The insertion part 51 is inserted in the space 33 to fill up the space 33. Wire connection parts M2 are sandwiched in and fixed by the support member 52A and the lid 52B. The wire connection parts M2 are where top ends of the leads 36, 36 are piled on top ends of the two core wires 31, 32. The pressing part 54 locally abuts with the wire connection parts M2. The terminal part is into die molding (see Japanese unexamined Patent Publication No. 2015-20548).

Accordingly, in the lower side terminal part of the protector 10, the support member 52A and the lid 52B on the second end of the insert 50, the covered parts 37, 37, and the part of the wire harness W are embedded in the part molded by mold and are not exposed.

The insertion part 51 prevents the molding material from flowing into the space 33. Also, the top ends of the leads 36, 36 and the top ends of the two core wires 31, 32 are electrically connected by the support member 52A and the lid 52B, which covers the support member 52A, not bonded directly. This configuration eliminates the need for use of adhesive or wire connection by resistance welding or soft soldering.

Also, with this configuration, exposure of the wire connection parts M2 from the part molded by mold or the damage on the wire connection parts M2 due to the injection molding pressure is prevented during die molding. The wire connection parts M2 are where the top ends of the leads 36, 36 are piled on the top ends of the two core wires 31, 32.

Unfortunately, however, while molding the lower side terminal part of the protector 10 by mold, illustrated in FIG. 17, air may be propagated along the covered parts 37, 37 or the wire harness W.

In case the air remains in the part molded by mold, the molding material is decreased in close adherence. The decreased close adherence leads to decreased water cut off function.

In this connection, Japanese Patent No. 6258735 is directed to a protector having a primary sealing layer and a secondary sealing layer. The primary sealing layer and the secondary sealing layer are formed by die molding and the secondary sealing layer is piled on the primary sealing layer. The protector, however, necessitates high manufacturing cost.

Therefore, an object of the present invention is to provide the protector stably formed by die molding and improved in the water cut off function.

SUMMARY

In order to achieve the above-mentioned object, according to one aspect of the invention, a protector (70) with a sensor is provided. The protector (70) includes an installation base member (11) and a hollow part (12).

The installation base member (11) couples to at least one of a peripheral edge of a panel and a peripheral edge of an opening of an automobile body. The panel moves between at least two positions to open and close the opening of the automobile body.

The hollow part (12) is integrally formed with the installation base member (11). The hollow part (12) has two core wires (31, 32) and a space (33). The space (33) is positioned between the two core wires (31, 32). When an object is disposed between the panel and the opening and makes contact with the hollow part (12) when the panel is moved towards a closed position, a corresponding change in an electric signal provides an indication that the object is in the opening.

In a terminal part, the core wires (31, 32) extend in a longitudinal direction, and the core wires (31, 32) are electrically connected with two leads (36, 36). The two leads (36, 36) extend from covered parts (37, 37). The covered parts (37, 37) are tied by a wire harness (W). An insert (80) is made of a non-conductive material. A first end of the insert (80) is inserted in and fills up the space (33). The terminal part is into die molding.

The insert (80) includes at least two feeding ports (85, 86) to receive and feed molding material into the insert (80) during die molding. The feeding ports (85, 86) are spaced from each other and formed along a direction in which the wire harness (W) extends. The covered parts (37, 37) are exposed from the wire harness (W) where the covered parts (37, 37) are faced with the feeding ports (85, 86).

It is to be noted that the "change in electric signal" includes a change by short between the two core wires, and a change in capacitance.

In addition, according to an aspect of the present invention, a second end of the insert (80) includes a support member (82A) and a lid (82B). The lid (82B) covers the support member (82A). First channels (83, 83) are formed on the support member (82A). Top ends of the two core wires (31, 32) and top ends of the two leads (36, 36) are fit in the first channels (83, 83).

A second channel (84) is formed between the support member (82A) and the lid (82B). The covered parts (37) and the wire harness (W) are fit in the second channel (84). The second channel (84) is continuous with the first channels (83, 83).

In addition, according to an aspect of the present invention, the second channel (84) includes pressing parts (87, 88). The pressing parts (87, 88) extend toward an inner side of the second channel (84) and fasten the wire harness (W), fit in the second channel (84).

In addition, according to an aspect of the present invention, the pressing parts (87, 88) on the second channel (84) include at least a first pressing part (87) and a second pressing part (88). The first pressing part (87) is on a first part of the second channel (84) closer to the first channels (83, 83). The second pressing part (88) is on a second part of the second channel (84) opposite to the first part and is at a distance from the first pressing part (87).

In addition, according to an aspect of the present invention, the first channels (83, 83) and the first part of the second channel (84) closer to the first channels (83, 83) are linear. The second part of the second channel (84) opposite to the first part is curved. The wire harness (W) has a U shape and is fit in the second channel (84).

In addition, according to an aspect of the present invention, the support member (82A) and the lid (82B) are made of materials bondable with the molding material.

It is to be noted that "bondable" includes welding and fusion bonding.

Symbols in parentheses show constituents or items corresponding to the drawings.

According to the present invention, the insert includes at least two feeding ports to receive and feed the molding material into the insert during die molding. The molding material flows into the insert from the feeding ports while the terminal part of the protector with the sensor is molded by mold. With this configuration, the molding material fills up a space (X) between the insert and the wire harness, and air does not remain in the space (X).

In addition, the two feeding ports are spaced from each other and formed along the direction in which the wire harness extends. The covered parts are exposed from the wire harness where the covered parts are faced with the feeding ports. With this configuration, the molding material also fills up a space (Y) between the wire harness and the covered parts, and air does not remain in the space (Y).

Since air does not remain in the part molded by mold, close adherence of the molding material is not decreased or water cut off function is not decreased.

In addition, the second end of the insert includes the support member and the lid. The lid covers the support member. The first channels are formed on the support member. The top ends of the two core wires and the top ends of the two leads are fit in the first channels. Also, the second channel is formed between the support member and the lid.

The covered parts and the wire harness are fit in the second channel. The second channel is continuous with the first channels. With this configuration, ends of the two core wires, ends of the leads, ends of the covered parts, and an end of the wire harness are stably fit in the insert without being exposed from the insert. This configuration improves assembly property.

In addition, with this configuration, the wire harness is not pressed against the insert during die molding.

In addition, the second channel includes the pressing parts. The pressing parts extend toward the inner side of the second channel and fasten the wire harness which is fit in the second channel. With this configuration, the wire harness is fixed on the insert more stably.

Especially, by locally fastening the wire harness with the first pressing part on the first part closer to the first channels and the second pressing part on the second part opposite to the first part, the wire harness is more stably fixed on the insert.

In addition, the first channels and the first part of the second channel closer to the first channels are linear, the second part of the second channel opposite to the first part is curved, and the wire harness which has the U shape is fit in the second channel. Since the second part of the second channel is curved, the molding material adheres to the insert over a wider range, and the wire harness and the leads are easier to set on the insert just before die molding. In addition, since the first channels and the first part of the second channel are linear, the wire connection parts are hard to rupture.

In addition, the support member and the lid are made of the materials bondable with the molding material. With this configuration, the insert and the molding material as bonded together yield sense of integrity, the protector becomes easier to handle, and water cut off function is improved.

DETAILED DESCRIPTION

Referring to the Drawings, a protector 70 according to an embodiment of the present invention with a sensor will be described.

The protector 70 couples to a front end surface of a sliding door 1 and extends toward a front part of an automobile body from the front end surface. The sliding door 1 moves between at least two positions to open and close an opening of the automobile body illustrated in FIG. 10. A sensor (pressure sensitive sensor) S is fixed in the protector 70 and outputs a corresponding electric signal upon detecting an object such as part of human bodies (fingers, hands, or legs) between the sliding door 1 and the opening of the automobile body (may also be front door or side door). The present invention and the prior art include configurations illustrated in FIG. 12 to FIG. 14 in common. The present invention differs from the prior art in configuration of an insert 80 of the present invention and inserts 25, 50 of the prior art. When constituents or items correspond to those in prior arts, the same symbols are used.

As illustrated in FIG. 13 and FIG. 14, in the same manner as a protector 10 according to the prior art, the protector 70 includes an installation base member 11, a hollow part 12, and a sensor (pressure sensitive sensor) S. The installation base member 11 directly couples to a flange (illustration omitted) formed on the sliding door 1. The hollow part 12 is integrally formed with the installation base member 11. The hollow part 12 makes contact with the object when the object including the finger is disposed between the front end surface of the sliding door 1 and the opening of the automobile body. The front end surface faces the opening of the automobile body. The sensor S is fixed in the hollow part 12 and outputs a corresponding electric signal upon detecting the object. The hollow part 12 has two core wires (electrode wires (including stranded wires)) 31, 32, rubber like elastic bodies 34, 35, and a space 33. The core wires 31, 32 extend in an upper and lower direction (longitudinal direction which is a direction parallel to the peripheral edge of the opening) and are embedded in the rubber like elastic bodies 34, 35. The rubber like elastic bodies 34, 35 have conductivity. The space 33 is positioned between the rubber like elastic bodies 34, 35. When an object is disposed between the panel and the opening and makes contact with the hollow part when the panel is moved towards a closed position, a corresponding change in electric signal provides an indication that the object is in the opening. It is to be noted that the "change in electric signal" includes a change by short between two core wires 31, 32, and a change in capacitance. The installation base member 11 has a plurality of holding lips 14, 14 formed inside and a core 15 embedded. The core 15 has a substantially U-shaped cross section and increase rigidity of the installation base member 11. In addition, a seal lip 16 is provided on an outer-cabin side wall 11b of the installation base member 11.

Figure 1:
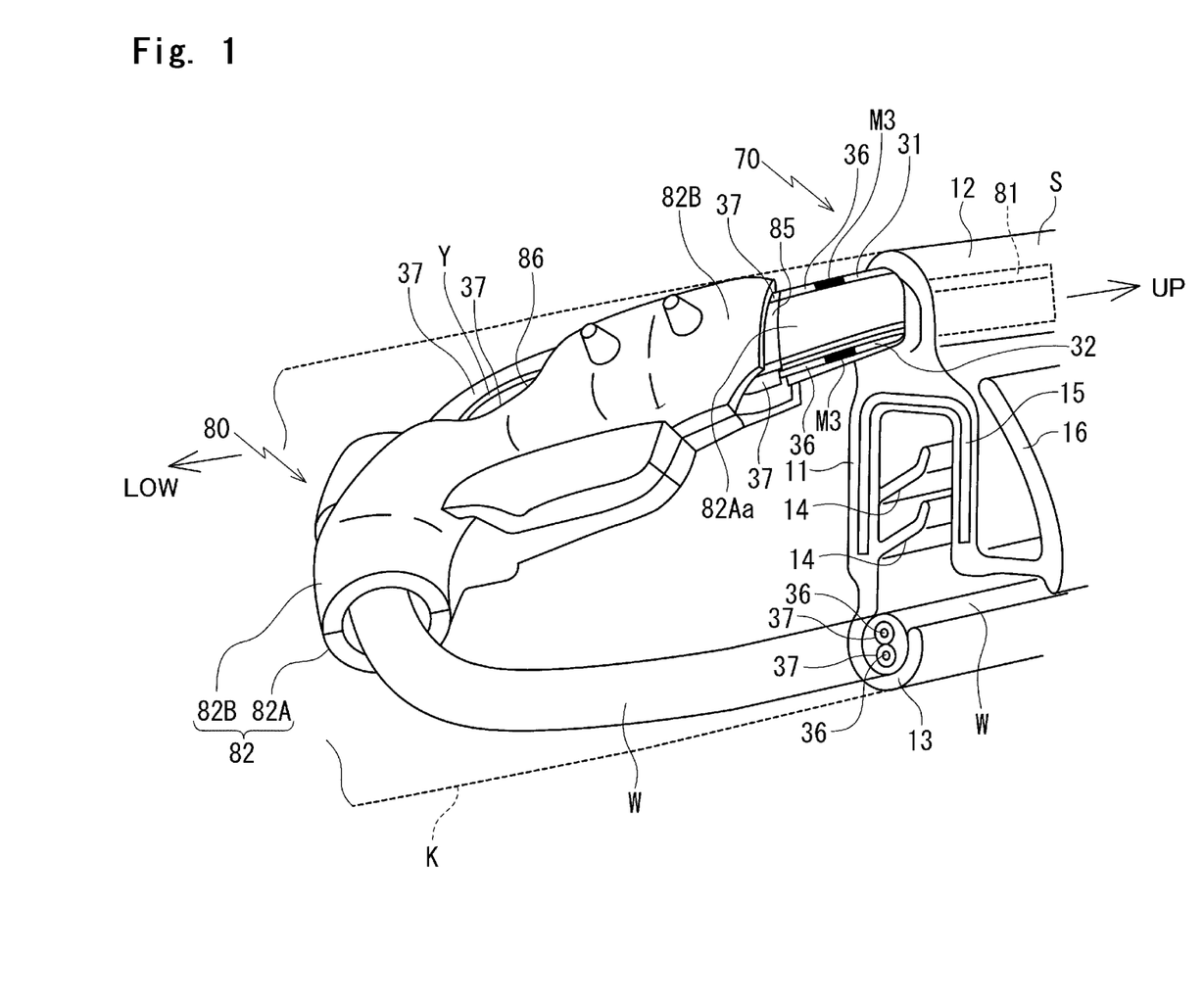
FIG. 1 is a perspective view of an important part of a lower terminal part of a protector according to an embodiment of the present invention with a sensor.

In a lower terminal part of the protector 70, as illustrated in FIG. 1, the insert 80 fills up the space 33 as an opening on the hollow part 12 and closes the space 33.

Figure 2:
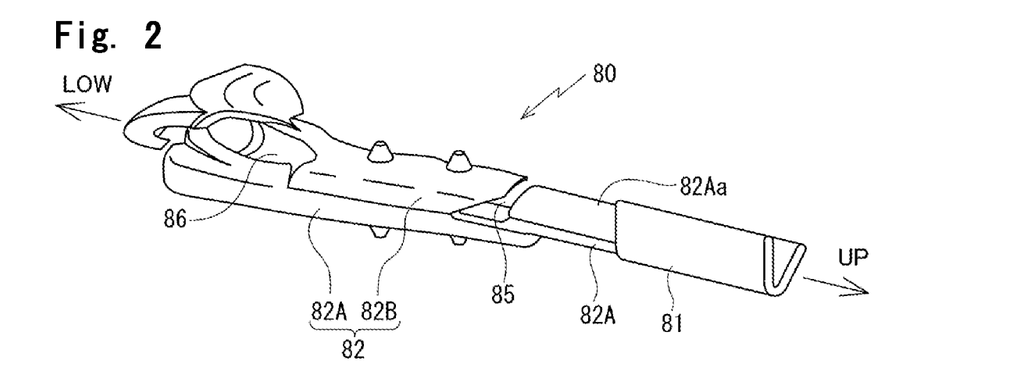
FIG. 2 is a perspective view of an insert of the protector illustrated in FIG. 1.
Figure 3:
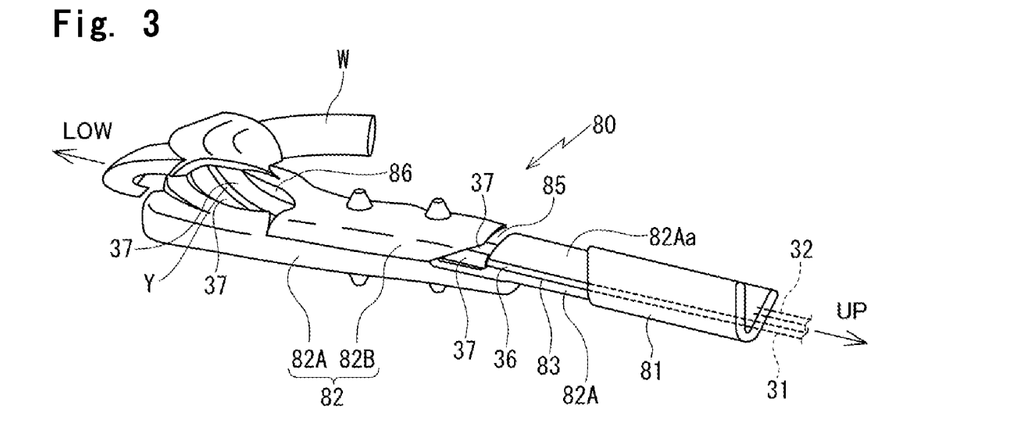
FIG. 3 is a perspective view of the insert of the protector illustrated in FIG. 1 with a wire harness fixed on the insert.

Examples of non-conductive material usable as the insert 80 include polypropylene, polyethylene, polyethylene terephthalate, nylon, 6 nylon, and 6-6 nylon. As illustrated in FIG. 2, the insert 80 includes an insertion part 81 on a first end and a protrusion part 82 on a second end. The insertion part 81 has a shape of a plate.

The insertion part 81 has a cross sectional shape which is substantially the same as or slightly larger than the space 33. When the insertion part 81 is inserted in the space 33, the insertion part 81 tightly fills up the space 33 and prevents malfunction of the sensor caused by the molding material flowing into the space 33 during die molding.

Figure 4:
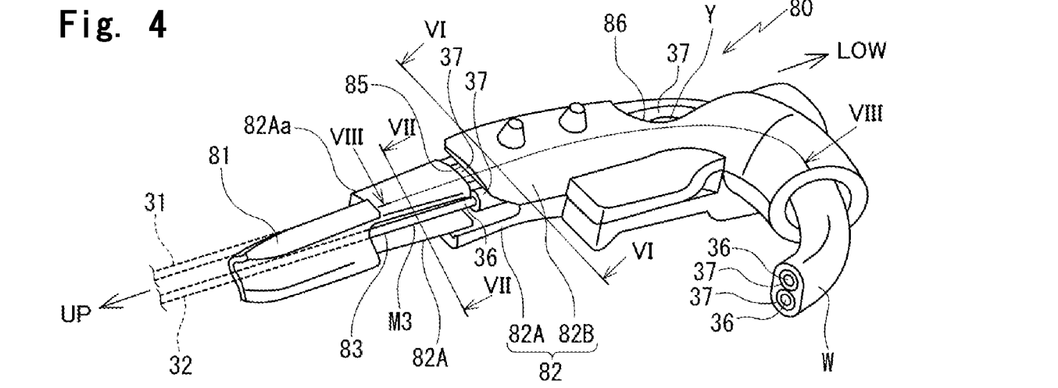
FIG. 4 is a perspective view of the insert of the protector illustrated in FIG. 1 with the wire harness fixed on the insert, taken along an angle different from FIG. 3.
Figure 5:
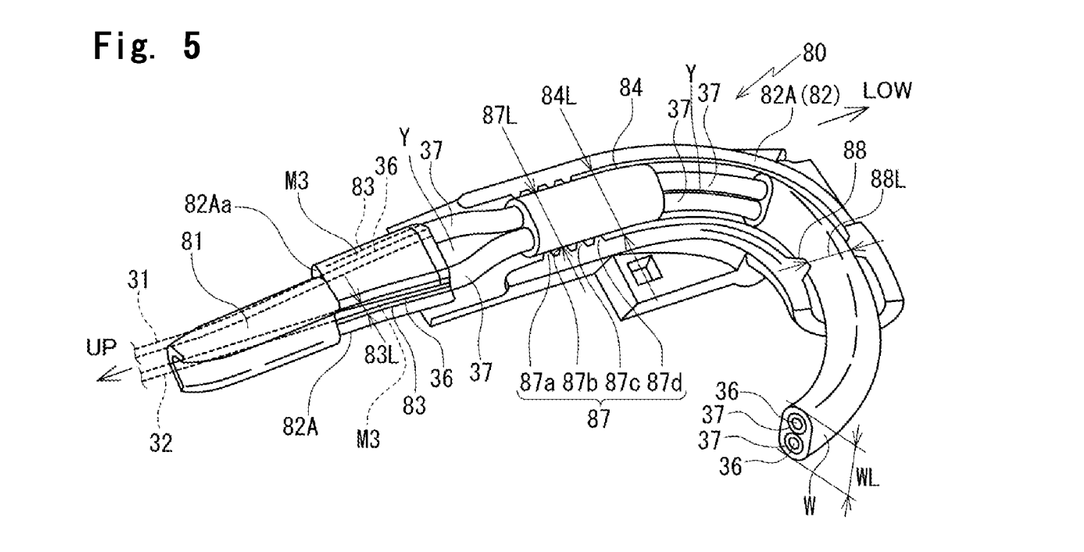
FIG. 5 is a perspective view of the insert illustrated in FIG. 4, with a lid removed.

In this embodiment, the insertion part 81 has the cross sectional shape which is substantially the same as the space 33. In case the space 33 has a V-shaped cross section, the insertion part 81 also has the V-shaped cross section as illustrated in FIG. 4 and FIG. 5.

The protrusion part 82 includes a support member 82A and a lid 82B to cover the support member 82A. First channels 83, 83 are formed on the support member 82A. Top ends of the two core wires 31, 32 and top ends of the two leads 36, 36 are piled up and are fit in the first channels 83, 83. The first channels 83, 83 are two separate channels at a distance from each other and formed on a front part 82Aa of the support member 82A, that is closer to the insertion part 81. The first channels 83, 83 extend in the longitudinal direction toward the protrusion part 82 from a border between the insertion part 81 and the protrusion part 82.

Figure 7:
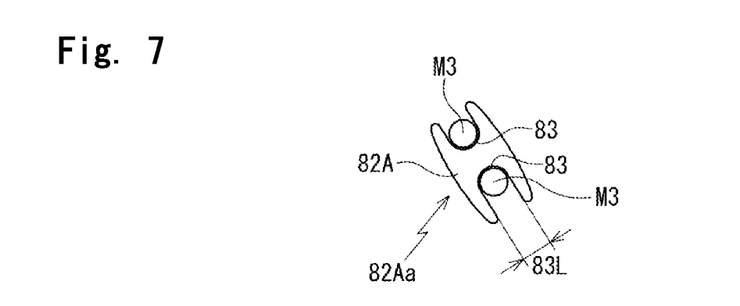
FIG. 7 is an enlarged cross sectional view of the protector taken along line VII-VII of FIG. 4.

In this embodiment, as illustrated in FIG. 7, channel widths 83L of the first channels 83, 83 are longer than diameters of the core wires 31, 32 and diameters of the two leads 36, 36. Accordingly, the two core wires 31, 32 and the two leads 36, 36, which are piled up, are easily fit in the first channels 83, 83 without applying an extra force.

While FIG. 7 illustrates the configuration of the insert 80 of the present embodiment, this should not be construed in a limiting sense. In the present invention, it is only required that the two core wires 31, 32 and the two leads 36, 36, which are piled up, are fit in the first channels 83, 83.

The front part 82Aa illustrated in FIG. 7 has a substantially H-shaped cross section with two concave-shaped parts as the first channels 83, 83, and wire connection parts M3 are fit in the first channels 83, 83. The wire connection parts M3 are where the leads 36, 36 are piled on the two core wires 31, 32. While in this embodiment the wire connection parts M3 are exposed and are visible from the exterior of the insert 80, this should not be construed in a limiting sense. Another possible embodiment is that a support member 52A and a lid 52B cover wire connection parts M2 as illustrated in FIG. 17 such that the wire connection parts M2 are not visible.

FIG. 5 illustrates a second channel 84. The second channel 84 is formed between the support member 82A and the lid 82B. The covered parts 37, 37 and the wire harness W are fit in the second channel 84. The second channel 84 is continuous with the first channels 83, 83.

A channel width 84L of the second channel 84 is longer than the channel widths 83L or a diameter (major diameter) WL of the wire harness W. Accordingly, the wire harness W is easily fit in the second channel 84 without applying the extra force.

As illustrated in FIG. 5, the insert 80 has a substantially J shape. Specifically, the insertion part 81 is linear and a second (lower) end of a second (lower) part of the protrusion part 82 is curved.

Accordingly, the first channels 83, 83 on the insertion part 81 and a first (upper) part of the second channel 84 on the protrusion part 82 are linear. The second (lower) part of the second channel 84 on the protrusion part 82 is curved. The first (upper) part of the second channel 84 is closer to the first channels 83, 83. The second part of the second channel 84 is opposite to the first part. The wire harness W extends toward a lower part of the automobile body, is turned to extend toward an upper part, and forms a U shape. The harness W, which has the U shape, is fit in the second channel 84.

In addition, the second channel 84 includes pressing parts 87, 88. The pressing parts 87, 88 extend toward an inner side of the second channel 84 and fasten the wire harness W, fit in the second channel 84.

The first pressing part 87 is on the first (upper) part of the second channel 84 closer to the first channels 83, 83, and fastens a first (upper) end of the wire harness W. The second pressing part 88 is on the second (lower) part of the second channel 84 opposite to the first (upper) part and is at a distance from the first pressing part 87. The second pressing part 88 fastens part of the wire harness W turned toward the upper part.

The first pressing part 87 and the second pressing part 88 are annular and extend toward the inner side of the second channel 84. An inside diameter 87L of the first pressing part 87 and an inside diameter 88L of the second pressing part 88 are shorter than the diameter WL. Accordingly, the first pressing part 87 and the second pressing part 88 locally tighten up the wire harness W.

While in this embodiment, the first pressing part 87 includes four annular layers (87a, 87b, 87c, 87d) with an interval between two adjacent layers, and the second pressing part 88 includes a singular layer, this should not be construed in a limiting sense.

In addition, as illustrated in FIG. 1 and FIG. 4, a feeding port 85 is formed between the support member 82A and a first (upper) end of the lid 82B. Also, a feeding port 86 is formed at a center of the lid 82B. The two feeding ports 85, 86 receive and feed molding material K into the second channel 84 during die molding.

The feeding ports 85, 86 are spaced from each other and formed along a direction in which the wire harness W extends. The covered parts 37, 37 are exposed from the wire harness W where the covered parts 37, 37 are faced with the feeding ports 85, 86. The wire harness W, which ties the covered parts 37, 37, is arranged in an interval between first (upper) covered parts 37, 37, which are exposed from the wire harness W, and second (lower) covered parts 37, 37, which are exposed from the wire harness W (that is an interval between the first covered parts 37, 37, closer to the feeding port 85, and the second covered parts 37, 37, closer to the feeding port 86).

The two core wires 31, 32 and the two leads 36, 36 are piled up and are fit in the first channels 83, 83 on the support member 82A, and the covered parts 37, 37 and the wire harness W are fit in the second channel 84. The lid 82B is fixed to the support member 82A and covers the support member 82A. In the lower terminal part of the protector 70, as illustrated in FIG. 1, the insertion part 81 is inserted in and fills up the space 33 as the opening on the hollow part 12 and closes the space 33.

Then, the lower terminal part of the protector 70 is molded by mold. As a result, the insert 80 is embedded in the part molded by mold, not exposed.

Figure 6:
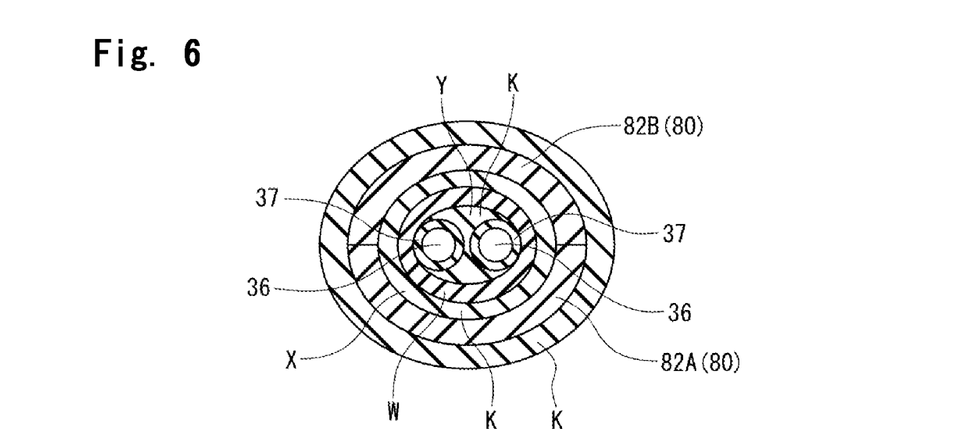
FIG. 6 is an enlarged cross sectional view of the protector taken along line VI-VI of FIG. 4.

The molding material K flows into the insert 80 through the feeding ports 85, 86, formed on the support member 82A and the lid 82B during die molding. As illustrated in FIG. 6, which is taken along line VI-VI of FIG. 4, the molding material K fills up a space X between the wire harness W and the insert 80, that is between the wire harness W and a combination of the support member 82A and the lid 82B. Also, the molding material K fills up a space Y between the wire harness W and the covered parts 37, 37. As a result, air does not remain in the spaces X or Y.

Figure 8:
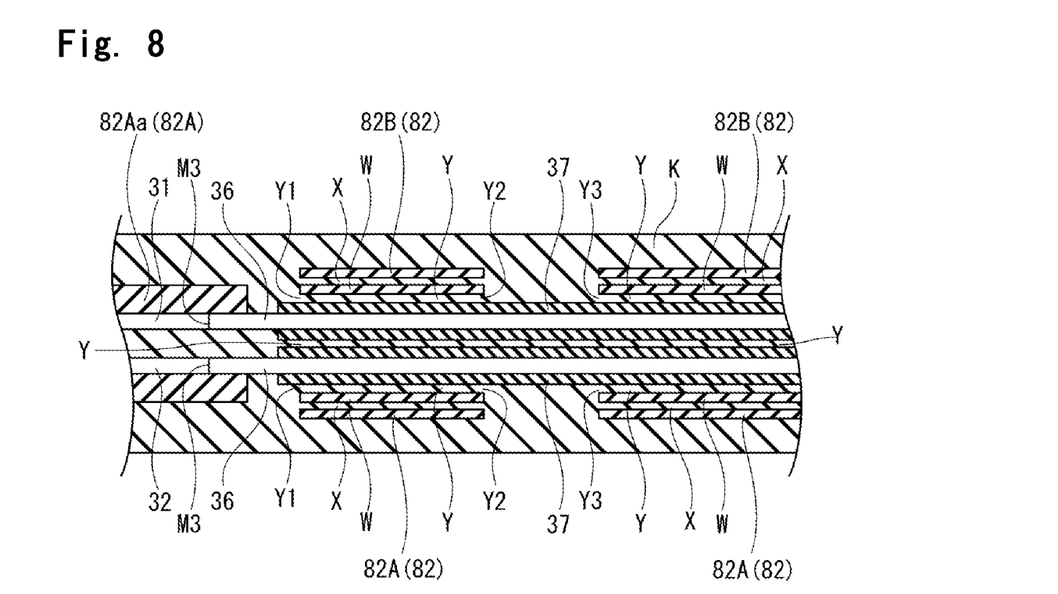
FIG. 8 is a schematic longitudinal sectional view (corresponding to line VIII-VIII of FIG. 4) of an important part of the protector illustrated in FIG. 1.

The molding material K, which passes through two feeding ports 85, 86, then passes through three areas Y1, Y2, and Y3 as illustrated in FIG. 8. In other words, the molding material K fills up the space Y for the effect of the two feeding ports 85, 86. FIG. 8 is a schematic longitudinal sectional view (corresponding to line VIII-VIII of FIG. 4) of an important part of the protector illustrated in FIG. 1. With this configuration, the molding material K certainly fills up the space Y and further prevents air from remaining in the space Y.

Since air does not remain in the part molded by mold, close adherence of the molding material K is not decreased or water cut off function is not decreased.

Also, since the molding material K fills up the space Y, water including rain water does not infiltrate into the hollow part from an air hole or affect sensitivity of a sensor.

When an X-ray examination of the insert 80 (after die molding) of the embodiment was made, computed tomography images revealed very small air pools in the space Y. The small air pools indicate that the space Y is highly filled with the molding material K.

In addition, a test specimen was prepared by laterally cutting part of the protector 70 of the embodiment molded by extrusion along line XIII-XIII illustrated in FIG. 12, and laterally cutting the wire harness W between part of the protector 70 molded by mold and a control unit 40.

The test specimen including an end part of the wire harness W as well as the part molded by mold and the wire harness W, which was exposed from the part molded by mold, was immersed in water. Then, pressurized air was sent into the test specimen from the space 33 on an end, which was not immersed in water, of the part molded by extrusion as a sealing performance test to check air leakage. As a result, no air leakage was found out.

The test results indicate that the air pools are at least smaller than molecules of water.

Material of the insert 80 and material of the molding material K may be similar in hardness and have flexibility. In some embodiments, the insert 80 is made of PP and the molding material K is made of TPO.

With this configuration, the insert 80 and the molding material K, as bonded together, yield sense of integrity, and the protector 70 becomes easier to handle. The hardness of the insert 80 and the molding material K is preferably in a range of 20 to 90 JISA, which is soft, of Japan Industrial Standards (JIS), more preferably in a range of 40 to 90 JISA. In case the hardness is less than 40 JISA, the part molded by mold may perform an insufficient function (including assemblability to the automobile body). In case the hardness is less than 20 JISA, the part molded by mold performs the insufficient function.

Another possible embodiment is that the insert 80 is covered by other types of resin material (including adhesive) to prevent infiltration of water into inner electric components or wiring. In this configuration, the other types of resin material which is as soft as or softer (lower in hardness) than the molding material K does not hamper the sense of integrity.

Another possible embodiment is that the material of the insert 80 and the material of the molding material K have compatibility. With this configuration also, the insert 80 and the molding material K yield the sense of integrity, and the protector 70 becomes easier to handle. In case the insert 80 is covered by the other types of resin material (including adhesive) to prevent infiltration of water, the compatibility simplifies selection of the adhesive to bond with the insert 80 and the molding material K firmly. Another possible embodiment is the material of the insert 80 and the material of the molding material K are so similar in property as to fuse. With this configuration, the insert 80 closely adheres to the molding material K during die molding without using adhesive, and infiltration of water into the inner electric components or wiring is prevented. It is to be noted that "compatibility" in a narrow sense indicates that the material of the insert 80 and the material of the molding material K are so similar in property as to fuse. In case one material is TPO, the other material is polypropylene, polyethylene, TPO, or TPE which includes olefinic resin. Examples of TPE which includes olefinic resin include thermoplastic styrenic elastomer (TPS). In case one material is TPS under the condition that TPS includes olefinic resin, the other material is compatible with the TPS and so similar in property as to weld or fuse like the aforementioned TPO.

While in this embodiment the protrusion part 82 is kept closed by fitting the lid 82B into the support member 82A from an upper side and anchoring the lid 82B to the support member 82A, this should not be construed in a limiting sense. Another possible embodiment is that the lid 82B openably couples to the support member 82A with a hinge or a thin part (illustration omitted).

While in this embodiment two feeding ports 85, 86 are formed, this should not be construed in a limiting sense. Another possible embodiment is that at least one extra feeding port is formed on at least one of the support member 82A and the lid 82B (illustration omitted).

Figure 9:
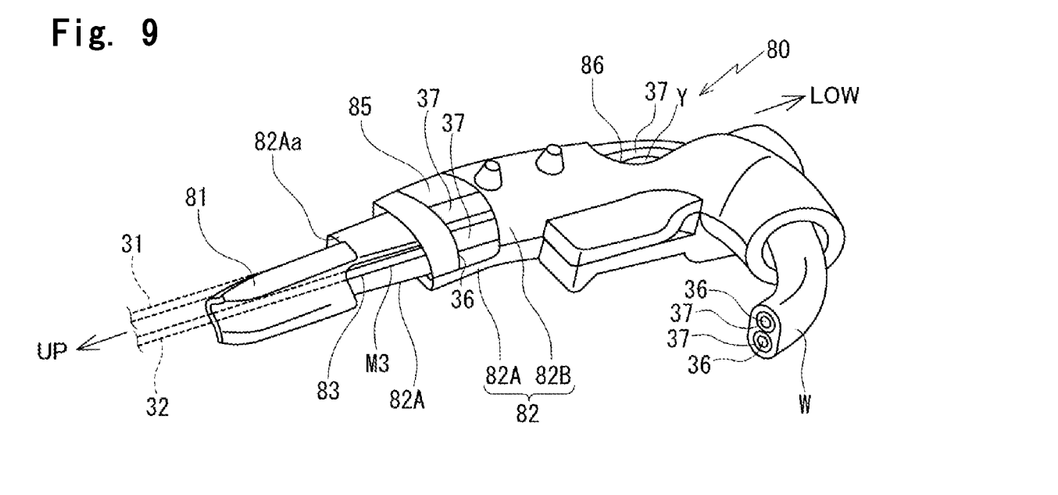
FIG. 9 is a perspective view of an insert of the protector according to another embodiment of the present invention with the wire harness fixed on the insert.

In this embodiment, as illustrated in FIG. 1 and FIG. 4, the feeding port 85 is formed between the support member 82A and the first (upper) end of the lid 82B, and the feeding port 86 is formed at the center of the lid 82B. The lid 82B is smaller than the support member 82A. Another possible embodiment is that, as illustrated in FIG. 9, the feeding port 85 is also formed on the lid 82B. In FIG. 9, an opening as the feeding port 85 is formed on an upper part of the lid 82B, fixed on the support member 82A.

In the embodiment illustrated in FIG. 9, the molding material K passes through four parts, a first (upper) part and a second (lower) part of the feeding port 85 and a first (upper) part and a second (lower) part of the feeding port 86 (in FIG. 8, three areas Y1, Y2, and Y3). In other words, the molding material K fills up the space Y for the effect of two feeding ports 85, 86. The first (upper) part of the feeding port 85 is closer to the first channels 83, 83. The second (lower) part of the feeding port 85 is opposite to the first part. The first (upper) part of the feeding port 86 is closer to the first channels 83, 83. The second (lower) part of the feeding port 86 is opposite to the first part.

While in this embodiment the protector 70 couples to the sliding door 1, which moves between at least two positions, this should not be construed in a limiting sense. Another possible embodiment is that the protector 70 couples to the opening of the automobile body and the sensor of the protector 70 outputs the corresponding signal upon detecting the object between the opening of the automobile body and the sliding door 1.

Still another possible embodiment is that the protector 70 couples to a back door or a sun roof 2 (FIG. 11).

We claim:

1. A protector with a sensor, the protector comprising:
   an installation base member operably couplable to at least one of a peripheral edge of a panel and a peripheral edge of an opening of an automobile body, the panel being movable between at least two positions to open and close the opening of the automobile body; and
   a hollow part integrally formed with the installation base member, the hollow part having two core wires and a space provided therein, and the space being positioned between the two core wires,
   wherein:
   when an object is disposed between the panel and the opening and makes contact with the hollow part when the panel is moved towards a closed position, an electric signal provides an indication that the object is in the opening,
   in a terminal part of the protector, the core wires extend in a longitudinal direction, the core wires are electrically connected with two leads, the two leads extend from covered parts, the covered parts being are tied by a wire harness, a first end of an insert made of a non-conductive material is inserted in and fills up the space, and the terminal part is formed by die molding,
   the insert includes at least two feeding ports configured to receive and feed molding material into the insert during die molding, the feeding ports being spaced from each other and formed along a direction in which the wire harness extends, and
   the covered parts are exposed from the wire harness where the covered parts are opposite the feeding ports.

2. The protector as claimed in claim 1, wherein:
   a second end of the insert includes a support member and a lid configured to cover the support member, first channels are formed on the support member, and top ends of the two core wires and top ends of the two leads are fit in the first channels, and
   a second channel is formed between the support member and the lid, the covered parts and the wire harness are fit in the second channel, and the second channel is continuous with the first channels.

3. The protector as claimed in claim 2, wherein the second channel includes pressing parts which extend toward an inner side of the second channel, the pressing parts being configured to fasten the wire harness in the second channel.

4. The protector as claimed in claim 3, wherein the pressing parts on the second channel include at least a first pressing part on a first part of the second channel closer to the first channels and a second pressing part on a second part of the second channel opposite to the first part, the second pressing part being at a distance from the first pressing part.

5. The protector as claimed in claim 2, wherein:
   the first channels and a first part of the second channel closer to the first channels are linear,
   a second part of the second channel opposite to the first part is curved, and
   the wire harness has a U shape and is fit in the second channel.

6. The protector as claimed in claim 2, wherein the support member and the lid are made of materials bondable with the molding material.

7. The protector as claimed in claim 3, wherein:
   the first channels and a first part of the second channel closer to the first channels are linear,
   a second part of the second channel opposite to the first part is curved, and
   the wire harness has a U shape and is fit in the second channel.

8. The protector as claimed in claim 4, wherein:
   the first channels and the first part of the second channel closer to the first channels are linear,
   the second part of the second channel opposite to the first part is curved, and
   the wire harness has a U shape and is fit in the second channel.

9. The protector as claimed in claim 3, wherein the support member and the lid are made of materials bondable with the molding material.

10. The protector as claimed in claim 4, wherein the support member and the lid are made of materials bondable with the molding material.

11. The protector as claimed in claim 5, wherein the support member and the lid are made of materials bondable with the molding material.

12. The protector as claimed in claim 7, wherein the support member and the lid are made of materials bondable with the molding material.

13. The protector as claimed in claim 8, wherein the support member and the lid are made of materials bondable with the molding material.

* * * * *